(12) United States Patent
Krude et al.

(10) Patent No.: US 6,739,422 B2
(45) Date of Patent: May 25, 2004

(54) ASSEMBLY FOR SUPPORTING AND DRIVINGLY CONNECTING A WHEEL

(75) Inventors: Werner Krude, Neunkirchen-Seelscheid (DE); Heinzwilli Fuchs, Mühleip (DE)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 10/204,835

(22) PCT Filed: Dec. 14, 2000

(86) PCT No.: PCT/EP00/12709
§ 371 (c)(1), (2), (4) Date: Mar. 31, 2003

(87) PCT Pub. No.: WO01/63135
PCT Pub. Date: Aug. 30, 2001

(65) Prior Publication Data
US 2003/0171153 A1 Sep. 11, 2003

(30) Foreign Application Priority Data
Feb. 23, 2000 (DE) .......................... 100 08 183
Feb. 23, 2000 (DE) .......................... 100 08 182

(51) Int. Cl.$^7$ ................................ B60K 17/24
(52) U.S. Cl. ...................... 180/256; 280/93.512
(58) Field of Search ........................ 180/252, 253, 180/254, 255, 256, 257; 280/93.512

(56) References Cited
U.S. PATENT DOCUMENTS
4,629,028 A    12/1986  Krude et al.
5,549,514 A *  8/1996   Welschof ............. 464/145

FOREIGN PATENT DOCUMENTS
| DE | 197 00 313 A1 | 7/1997 |
| DE | 197 51 855 C1 | 4/1999 |
| EP | 0 852 300 A2 | 7/1998 |
| WO | WO 99/13232 | 3/1999 |

\* cited by examiner

Primary Examiner—Kevin Hurley (57) ABSTRACT

An assembly (10) for supporting a wheel of a motor vehicle and for drivingly connecting the wheel to a driveshaft, comprising a wheel carrier (11) which is attachable to the motor vehicle and is provided with an annular part (15) and a plurality of steering arms (16); a wheel hub (41) which is rotatably supported in the annular part (15) of the wheel carrier (11) and is provided with a flange (46) for bolting on the wheel; a rolling contact bearing (51) with two rows of rolling contact members for supporting the wheel hub (41) in the wheel carrier (11), which rolling contact bearing (51) is insertable into the annular part (15) of the wheel carrier (11); and a constant velocity joint (71) which comprises an outer joint part (72) removably connectable to the wheel hub (41), and an inner joint part connectable to the driveshaft, wherein the connection between the wheel hub (41) and the outer joint part (72) is provided by inter-engaging toothings, wherein at the wheel carrier ($11_1$), in the annular part ($15_1$), there is provided a broken-out portion ($27_1$) in at least one circumferential position, so that a securing ring can be handled by pliers through the broken-out portion ($27_1$).

32 Claims, 7 Drawing Sheets

FIG.10

ASSEMBLY FOR SUPPORTING AND DRIVINGLY CONNECTING A WHEEL

BACKGROUND OF THE INVENTION

The invention relates to an assembly for supporting a wheel of a motor vehicle and for drivingly connecting the wheel to a driveshaft, comprising a wheel carrier which is attachable to the motor vehicle and is provided with an annular part and a plurality of steering arms; a wheel hub which is rotatably supported in the annular part of the wheel carrier and is provided with a flange for bolting on the wheel; a rolling contact bearing with two rows of rolling contact members for supporting the wheel hub in the wheel carrier, which rolling contact bearing is insertable into the annular part of the wheel carrier; and a constant velocity joint which comprises an outer joint part removably connectable to the wheel hub, and an inner joint part connectable to the driveshaft, wherein the connection between the wheel hub and the outer joint part is provided by inter-engaging toothings of which a first toothing is formed at a part of the wheel hub and wherein a second toothing is formed at a sleeve projection at the outer joint part, and wherein the inter-engaging toothings are axially secured by a securing ring which engages two annular grooves of which a first annular groove is formed at said part of the wheel hub in the region of the first toothing and wherein a second annular groove is provided at the sleeve projection in the region of the second toothing.

From WO 99/13232 there is known a unit of said type wherein, for assembly purposes, the securing ring is inserted into the annular groove on the wheel hub and is contracted by means of a clamp in such a way that it is positioned fully within the base diameter of the toothing or wherein the securing ring is inserted into the annular groove in the outer joint part and expanded by means of a wedge in such a way that it is positioned fully outside the base diameter of the toothing. Thereafter, the counter piece is mounted, i.e. the outer joint part is slid on or the wheel hub slid in until the annular groove provided therein axially overlaps with the securing ring, and the clamp or wedge is radially outwardly removed. In the process, the securing ring expands so that it also engages the annular groove in the outer joint part, or the securing ring contracts, so that it also engages the annular groove in the wheel hub. In both embodiments, there is provided a notch at the end of the outer joint part, which notch accommodates the clamp or wedge as well as radially bent ends of the securing ring. To render the securing ring manipulatable in connection with removing the clamp or wedge, with the wheel hub being mounted in the wheel carrier, the wheel carrier is provided with a radial bore which is positioned so as to axially correspond to the annular grooves or, respectively, to the notch in the outer joint part, permitting access to a tongue projection at the clamp or wedge from the outside of the wheel carrier. Once the assembly of the unit has been completed by removing the clamp or wedge, dismantling is possible only by destroying the securing ring by applying axial forces between the wheel hub and outer joint part.

DE 197 00 313 A1 proposes an assembly of said type wherein the securing ring is provided in the form of a snap ring which automatically engages the inner groove in the inner toothing of the outer joint part. Such an assembly cannot be dismantled in a non-destructive way. On the contrary, when the wheel hub unit and the constant velocity joint are forcibly removed in the axial direction, the securing ring is squashed and the toothings may be damaged at the same time. From DE 197 51 855 C1, there is known an assembly of the initially mentioned type wherein the securing ring is freely radially accessible from the outside and is positioned axially relative to the joint end, in front of the annular part of the wheel carrier. For this purpose, the wheel hub is connected to a driving ring which carries the respective toothing to achieve toothing engagement with the outer joint part, which driving ring is axially extended beyond the hub end. This increases the overall length of the assembly, as a result of which simultaneously available length for the driveshaft is lost, with the constant velocity joint forming part of said driveshaft. Said length represents a particularly critical aspect because shortening the driveshaft with predetermined maximum joint angles goes hand in hand with a reduction in the steering angles and spring travel.

SUMMARY OF THE INVENTION

It is an object of the present invention to further develop an assembly of said type in such a way as to facilitate the assembly and dismantling of the constant velocity joint and simultaneously to improve the ability to replace driveshafts in motor vehicles. A first solution consists in that, at the wheel carrier, in the annular part, in at least one circumferential position, there is provided a broken-out portion which axially cuts into the annular part from the wheel end and that, with a rolling contact bearing secured in the wheel carrier and with an outer joint part connected to the wheel hub, the two annular grooves are positioned so as to axially correspond to the broken-out portion, and the securing ring can be handled by pliers through the broken-out portion. A second solution consists in that, at the wheel carrier, in the annular part, in at least one circumferential position, there is provided a broken-out portion which axially cuts into the annular part from the joint end and that, with a rolling contact bearing secured in the wheel carrier and with an outer joint part connected to the wheel hub, the two annular grooves are positioned so as to axially correspond to the broken-out portion, so that the securing ring can be handled by pliers through the broken-out portion. The means described here allow a driveshaft to be assembled and dismantled in a non-destructive way without there being any need for the vehicle wheel to be removed from the wheel hub or for the wheel hub to be removed from the wheel carrier and without the wheel carrier having to be removed in any way from the vehicle. The plunging distance required for the assembling and dismantling operations and for releasing the inter-engaging toothings necessarily exists design-based in the constant velocity joint at the differential end. Without substantially adversely affecting the strength of the annular member, the design of the broken-out portion permits the necessary access to the securing ring. For this purpose, the shaft with the outer joint part has to be moved into a rotational position in which, in a radial view, the ends of the securing ring come to rest below the notch, and the securing ring, again in an axial view, is positioned inside the longitudinal extension of the broken- out portion.

It is the object of the present invention to further develop an assembly of said type in such a way as to facilitate the assembly and dismantling of the constant velocity joint and simultaneously to improve the ability to replace driveshafts in motor vehicles. A first solution consists in that, at the wheel carrier, in the annular part, in at least one circumferential position, there is provided a broken-out portion which axially cuts into the annular part from the wheel end and that, with a rolling contact bearing secured in the wheel carrier and with an outer joint part connected to the wheel hub, the two annular grooves are positioned so as to axially correspond to the broken-out portion, and the securing ring can be handled by pliers through the broken-out portion. A second solution consists in that, at the wheel carrier, in the annular part, in at least one circumferential position, there is provided a broken-out portion which axially cuts into the annular part from the joint end and that, with a rolling contact bearing secured in the wheel carrier and with an outer joint part connected to the wheel hub, the two annular grooves are positioned so as to axially correspond to the broken-out portion, so that the securing ring can be handled by pliers through the broken-out portion. The means described here allow a driveshaft to be assembled and dismantled in a non-destructive way without there being any need for the vehicle wheel to be removed from the wheel hub or for the wheel hub to be removed from the wheel carrier and without the wheel carrier having to be removed in any way from the vehicle. The plunging distance required for the assembling and dismantling operations and for releasing the inter-engaging toothings necessarily exists design-based in the constant velocity joint at the differential end. Without substantially adversely affecting the strength of the annular member, the design of the broken-out portion permits the necessary access to the securing ring. For this purpose, the shaft with the outer joint part has to be moved into a rotational position in which, in a radial view, the ends of the securing ring come to rest below the notch, and the securing ring, again in an axial view, is positioned inside the longitudinal extension of the broken-out portion.

According to an advantageous embodiment for both solutions, it is proposed that, in the circumferential direction, directly on both sides of the broken-out portion, there are provided bolting means between the annular part of the wheel carrier and the outer bearing race of the rolling contact bearing. In this way, the reduction in material at the annular member resulting from the broken-out portion is compensated for by the connection between the annular member and the outer bearing race.

According to an advantageous embodiment of the second solution, it is proposed that the broken-out portion is positioned in the region of a steering arm into which it cuts radially. In this case, too, the reduction in material at the annular member resulting from the broken-out portion is compensated for by the bridging function of the steering arm.

In order to exclude load peaks and to ensure a harmonious curve of forces, the broken-out portion, in an axial view, is substantially U-shaped or optionally substantially U-shaped in an axial view.

In a preferred embodiment, the toothings at the sleeve projection and at the wheel hub are provided in the form of inter-engaging hub and shaft toothings and, at the sleeve projection in the region of the hub toothing, there is provided a circumferentially delimited and axially delimited notch which interrupts the second annular groove and which, with an outer joint part connected to the wheel hub, exposes the first annular groove in the shaft toothing of the wheel hub and the securing ring in a circumferentially delimited way. The ends of the securing ring are then able to engage the notch and support themselves thereon in the circumferential direction. The ends of the securing ring projecting outwardly from the notch are accessible through the broken-out portion for assembling and dismantling purposes.

According to a further solution wherein, at the sleeve projection, in the region of the toothing, there is provided a circumferentially delimited and axially delimited notch which interrupts the second annular groove and which, with the outer joint part connected to the wheel hub, exposes the first annular groove and the securing ring in a circumferentially delimited way, wherein an approximately radially extending bore is provided at the wheel carrier in the annular part and wherein, with the rolling contact bearing secured in the wheel carrier and with the outer joint part connected to the wheel hub, the two annular grooves are positioned so as to axially correspond to the bore, it is proposed that the diameter d of the bore is smaller than or equal to the circumferential extension b of the notch and that the securing ring can be handled by pliers through the bore. The means described here allow a driveshaft to be assembled and dismantled in a non-destructive way without there being any need for the vehicle wheel to be removed from the wheel hub or for the wheel hub to be removed from the wheel carrier and without the wheel carrier having to be removed in any way from the vehicle. The plunging distance required for the assembling and dismantling operations and for releasing the inter-engaging toothings necessarily exists design-based in the constant velocity joint at the differential end. In spite of reducing the size of the bore relative to the circumferential extension of the notch, the securing ring can be gripped in a conventional way by pliers.

According to an advantageous embodiment, it is proposed that the axial depth t of the notch is smaller than the diameter d of the bore. In this way it is ensured that the outer joint part is weakened as little as possible by the notch. At the same time it is ensured that outwardly bent ends of the securing ring engage the notch and act as anti-rotation means relative thereto.

After the assembly has been assembled and mounted, the bore can be used for receiving an ABS sensor. For this purpose, a pulse generating ring has to be arranged in the direct vicinity of the securing ring, for example on the outer joint part.

For production reasons it is advantageous if the first toothing at the hub member is provided at a separate driving ring which is slid on to the wheel hub and non-removably secured thereto. To prevent any rotation between said two parts, these, in turn, can be provided with inter-engaging longitudinal toothings. The driving ring can be axially secured on the wheel hub, in particular, by hub member beading. The driving ring can axially rest against an inner bearing race of a first row of rolling contact members, which bearing race is also slid on to the hub member and which, at the same time, is clamped by the driving ring against an inner bearing race of a second row of rolling contact members. As a rule, the second inner bearing race is formed directly from the hub member.

In an advantageous way, the subject of the present invention provides a short assembly of said type which, by simple means and in a non-destructive way and without removing the wheel carrier unit and the wheel hub unit, can be separated from the constant velocity joint of a driveshaft. At the same time the invention ensures easy accessibility for assembly purposes without substantially reducing the strength of the assemblies. In an advantageous way, the subject of the present invention provides a short assembly of said type which, by simple means and in a non-destructive way and without removing the wheel carrier unit and the wheel hub unit, can be separated from the constant velocity joint of a driveshaft. At the same time the invention ensures easy accessibility for assembly purposes without substantially reducing the strength of the assemblies.

BRIEF DESCRIPTION OF THE DRAWINGS

Preferred embodiments of the inventive assemblies to be attached to a vehicle will be described below with reference to the drawings wherein

FIG. 5a shows the assembly according to FIG. 4 with the wheel hub and joint unit separated from the wheel carrier, in a longitudinal section according to FIG. 4a.

Figure 1:
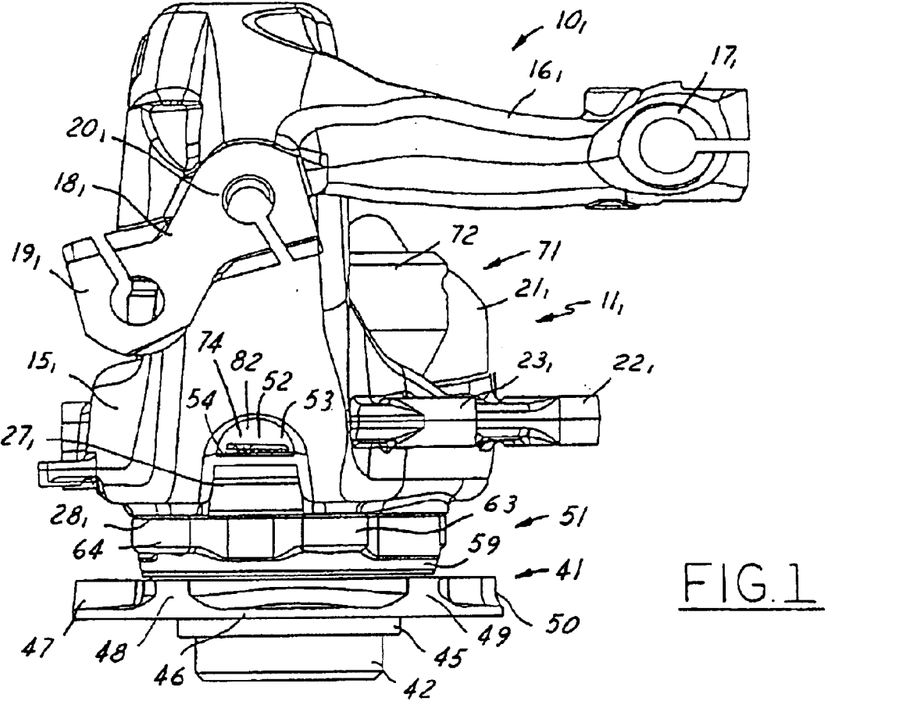
FIG. 1 is a view from above of a completely assembled unit of a first type with a broken-out portion at the flange end in a linear illustration.

FIGS. 1a and 1b will be described jointly below. The inventive assembly $10_1$ comprises a wheel carrier $11_1$, a wheel hub 41 and a constant velocity joint 71. The wheel carrier $11_1$ can be seen to be provided with a central annular part $15_1$ comprising a first steering arm $16_1$, with a fixing eye $17_1$ and a second steering arm $18_1$ with two fixing eyes $19_1$, $20_1$. Further fixing eyes $21_1$, $22_1$, $23_1$, are formed in different directions at the annular part $15_1$. In the annular part $15_1$ there is provided a broken-out portion $27_1$, which is open towards the wheel hub unit 41, which extends parallel to the axis of the annular part as far as a flange face $28_1$ of the annular part $15_1$ and which ends therein. The wheel hub unit 41 comprises a wheel bearing 51 with an outer bearing race 59 which is shown to comprise bolting means 63, 64 which serve for being threaded on to the flange face $28_1$ of the annular part $15_1$ and which directly adjoin each side of the broken-out portion $27_1$. In the wheel bearing 51 there is supported the hub member 45 which carries a wheel flange 46 having four flange eyes 47–50. A cap 43 is placed on to the wheel hub 41. The constant velocity joint unit 71 comprises an outer joint part 72 with a sleeve projection 82, with a notch 74 being provided in the end face 73 at the wheel hub end, which notch 74 is turned so as to correspond to the broken-out portion $27_1$ in the annular part $15_1$ of the wheel carrier $11_1$. Through said notch 74 it is possible to see an outer toothing 52, with an annular groove 53 being turned into said outer toothing 52. It is also possible to see a sealing ring 54 through said broken-out portion $27_1$.

DETAILED DESCRIPTION OF THE INVENTION

FIG. 1 will be described below. The inventive assembly $10_1$ comprises a wheel carrier $11_1$, a wheel hub 41 and a constant velocity joint 71. The wheel carrier $11_1$ can be seen to be provided with a central annular part $15_1$ comprising a first steering arm $16_1$ with a fixing eye $17_1$ and a second steering arm $18_1$ with two fixing eyes $19_1$, $20_1$, further fixing eyes $21_1$, $22_1$, $23_1$ are formed in different directions at the annular part $15_1$. In the annular part 15-1 there is provided a broken-out portion $27_1$ which is open towards the wheel hub unit 41, which extends parallel to the axis of the annular part as far as a flange face $28_1$ of the annular part $15^1$ and which ends therein. The wheel hub unit 41 comprises a wheel bearing 51 with an outer bearing race 59 which is shown to comprise bolting means 63, 64 which serve for being threaded on to the flange face $28_1$ of the annular part $15_1$ and which directly adjoin each side of the broken-out portion $27_1$. In the wheel bearing 51 there is supported the hub member 45 which carries a wheel flange 46 having four flange eyes 47–50. A cap 43 is place don to the wheel hub 41. The constant velocity joint unit 71 comprises an outer joint part 72 with a sleeve projection 82, with a notch 74 being provided in the end face 73 at the wheel hub end, which notch 74 is turned so as to correspond to the broken-out portion $27_1$ in the annular part $15_1$ of the wheel carrier $11_1$. Through said notch 74 it is possible to see an outer toothing 52, with an annular groove 53 being turned into said outer toothing 52. It is also possible to see a sealing ring 54 through said broken-out portion $27_1$.

Figure 2:
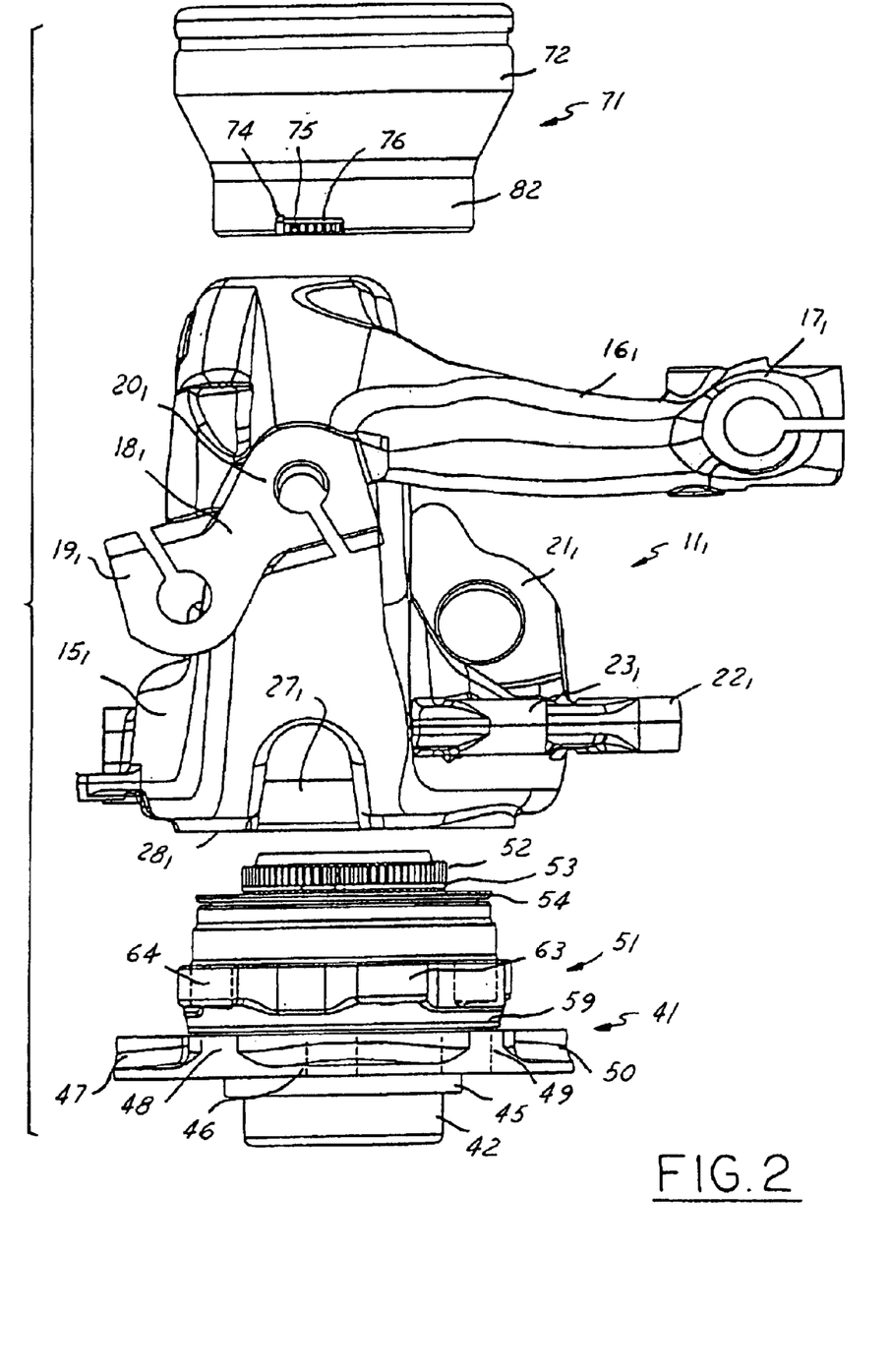
FIG. 2 shows the assembly according to FIG. 1 in a dismantled condition with the wheel hub and outer joint part separated from the wheel carrier, without the securing ring in a linear illustration.

In FIG. 2, the details corresponding to those shown in FIG. 1 have been given the same reference numbers. To that extent, reference is made to the respective description. The wheel hub unit 41, the wheel carrier $11_1$ and the constant velocity joint unit 71 are shown along the axis of rotation in a spread-apart position in an exploded view. Apart from the details referred to in connection with FIG. 1, the wheel carrier $11_1$ is not shown to comprise any further details. The wheel hub unit 41 clearly shows the outer toothing 52 in its complete axial extension as well as its annular groove 53. Through the notch 74 it is possible to see an inner toothing 75 at the outer joint part 72 of the constant velocity joint 71, with a further annular groove 76 being provided in said inner toothing 75. When the unit is assembled, the inner toothing 75 engages the outer toothing 52 at the wheel hub 41, with the annular groove 53 overlapping with the annular groove 76 and with both, jointly, accommodating a securing ring 57.

Figure 3:
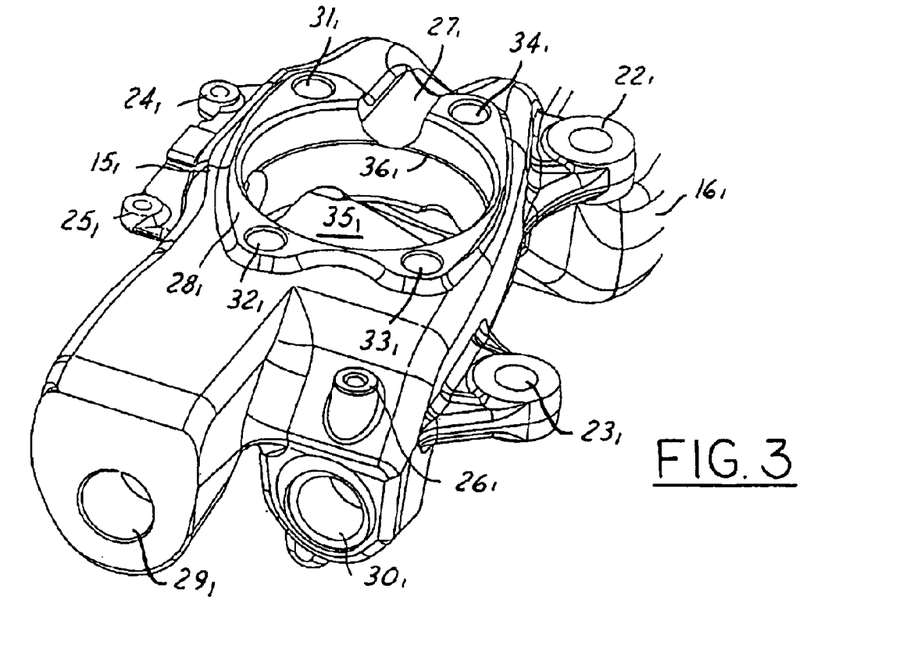
FIG. 3 shows the wheel carrier according to FIGS. 1 and 2 in the form of a detail in an inclined view from the flange end in a linear illustration.

FIG. 3 shows the annular part $15_1$, of the wheel carrier $11_1$ in a view taken from the flange face $28_1$, with the radial extension of the broken-out portion $27_1$, being clearly visible. The annular part $15_1$, is shown to comprise further eyes $24_1$, $25_1$, $26_1$, with bores which extend parallel to the axis, as well as further larger eyes $29_1$, $30_1$, for rotary journals and steering arms. In the flange face $28_1$, there are provided threaded bores $31_1$, $32_1$, $33_1$, $34_1$, for being threaded on the outer bearing race 59. Furthermore, there can be seen an annular groove $36_1$ for receiving the above-mentioned sealing ring $54_1$ in the through-hole $35_1$ of the annular part $15_1$.

Figure 4A:
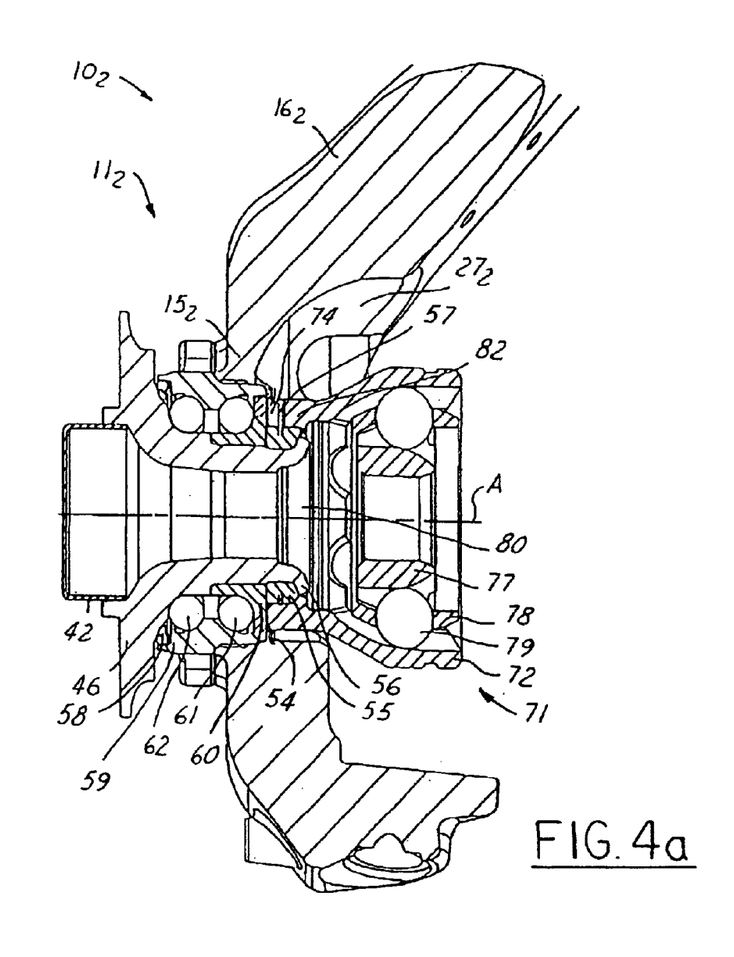
FIG. 4 shows a completely assembled unit of a second type with a broken-out portion at the joint end a) in a longitudinal section through the axis of rotation in a linear illustration b) in a view from the joint end including a phantom illustration of the constant velocity universal joint in a perspective linear illustration.
Figure 4B:
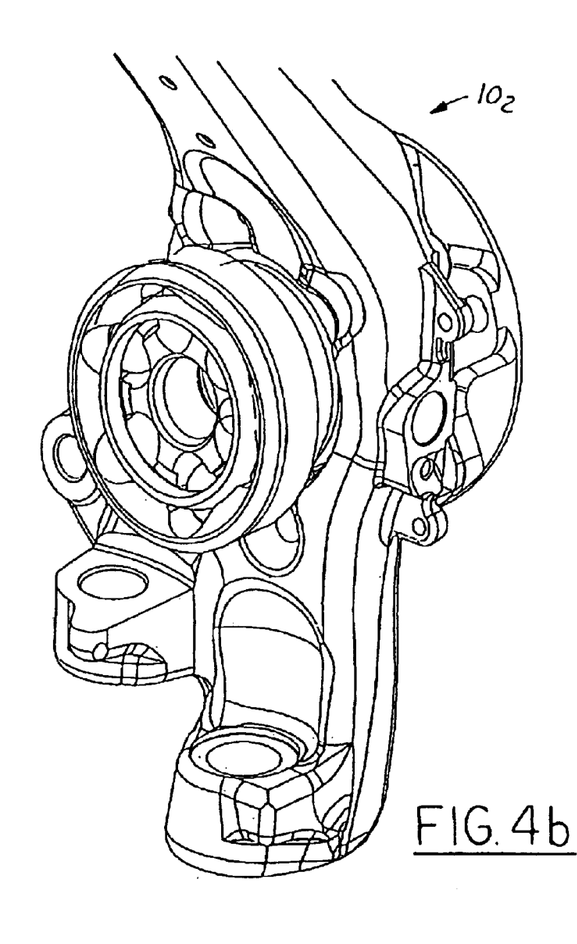
Figure 5A:
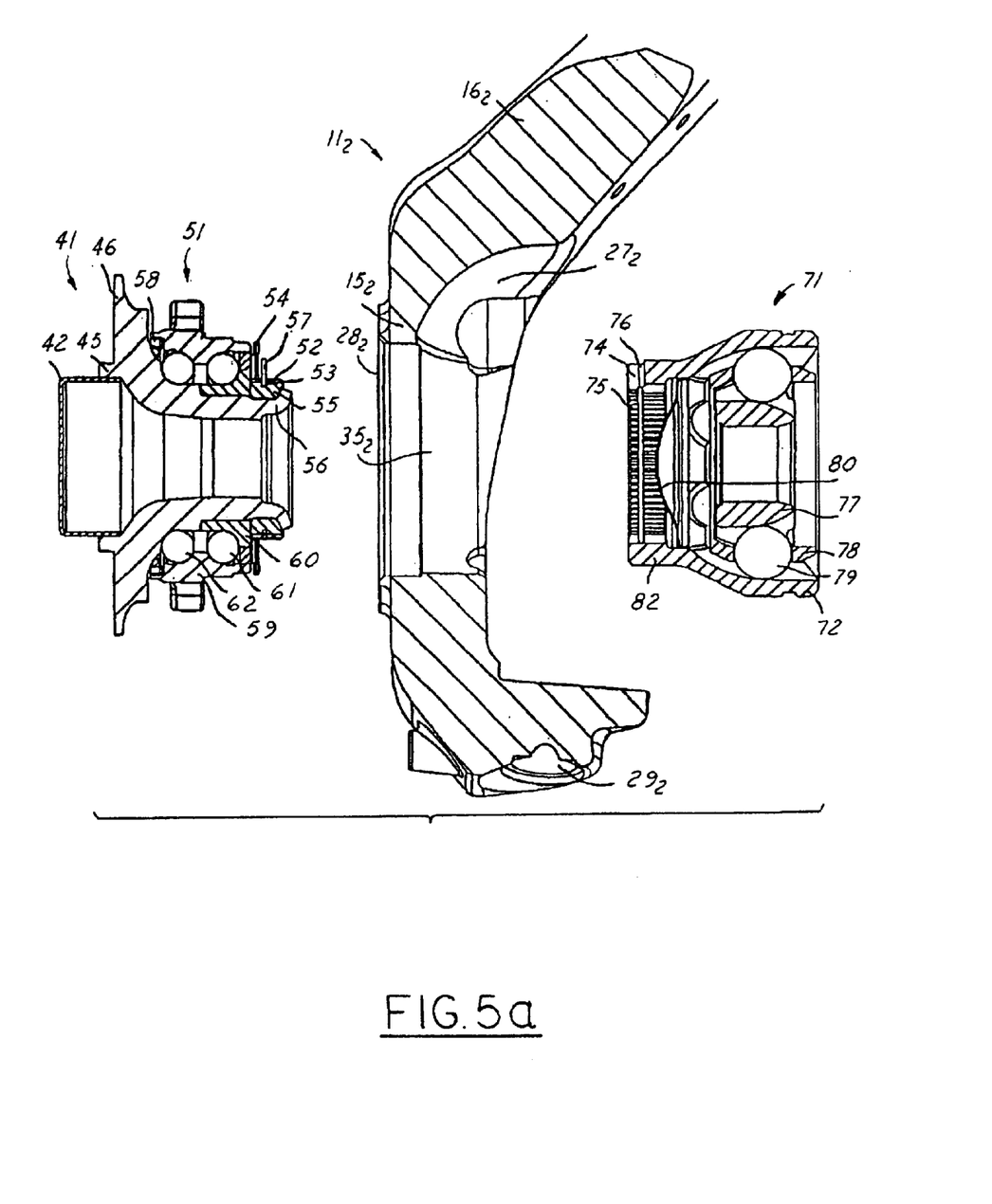
Figure 5B:
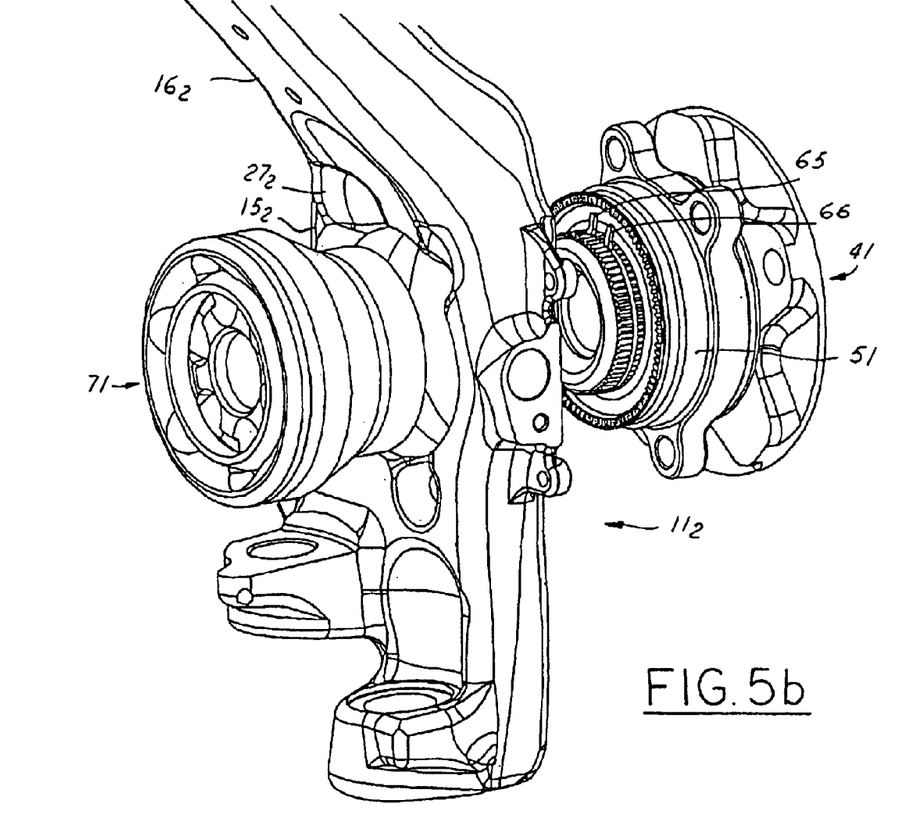
FIG. 5b shows the assembly according to FIG. 4 with the wheel hub and the constant velocity joint separated from the wheel carrier, in a linear illustration according to FIG. 4b.
Figure 6:
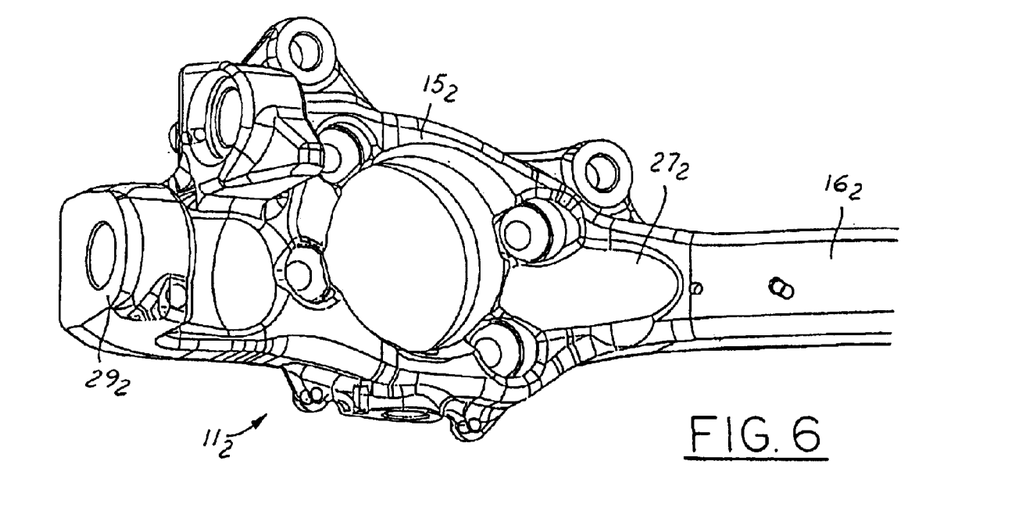
FIG. 6 shows the wheel carrier according to FIGS. 4 and 5 in the form of a detail in a perspective linear illustration.

In FIGS. 4 to 6, any details corresponding to those shown in FIGS. 1 to 3 have been given the same reference numbers. The details of the deviating wheel carrier have been given the index 2.

FIG. 4a deviates from FIGS. 1 to 3 in that, in the wheel carrier $11_2$ whose steering arm $16_2$ is broken off in the illustration and whose bearing eye $29_2$ is shown in section, there is provided a broken-out portion $27_2$ which extends substantially parallel to the axis of rotation of the assembly $10_2$ and, at the same time, extends radially therefrom into the steering arm $16_2$. Of the wheel hub unit 41 it is possible to see the hub member 45 and the wheel flange 46. Of the wheel bearing 51, beyond the outer bearing race 59, it is possible to see two rows 61, 62 of rolling contact members and an inner bearing race 60 which is positioned on the hub member 45. The latter is connected to a driving ring 55 provided with the annular groove 53. At the end of the hub member 45, there is provided a beading 56 which holds the driving ring 55. A securing ring 57 is inserted into the annular groove 53. In the wheel bearing 51 it is possible to see a sealing ring 58 and the above-mentioned sealing ring 54. The constant velocity joint 71, apart from comprising the outer joint part 72 with the notch 74, is shown to comprise an inner joint part 77, a ball cage 78 and torque transmitting balls 79 as well as a sealing sheet metal cover 80. The outer joint part 72 is slid on to the driving ring 55, with the securing ring 57 engaging the two annular grooves 53, 76 which are arranged so as to correspond to one another.

In FIG. 5a, the components of the assembly $10_2$, the wheel carrier $11_2$, the wheel hub unit 41 and the constant velocity joint 71 are pulled apart along their axes and shown in an exploded view. In particular, FIG. 5b shows the outwardly bent portions which are positioned at the ring ends 65, 66, which come to rest in the broken-out portion 27 and which, at the same time, form anti-rotation means relative to the broken-out portion 27. Instead of the outwardly bent portions it is also possible to provide enlarged eyes or the like at the ring ends 65, 66.

FIG. 6 shows the wheel carrier $11_2$ with the above-explained details which, in this Figure, have been given the same reference numbers. It is particularly easy to identify the broken-out portion $27_2$ at the wheel end which extends symmetrically relative to the longitudinal axis of the bore $35_2$ and radially into the steering arm $16_2$. It can be seen that by using the broken-out portion $27_2$, there is provided free access to the securing ring 57 connecting the wheel hub unit 41 and the constant velocity joint 71.

Figure 7:
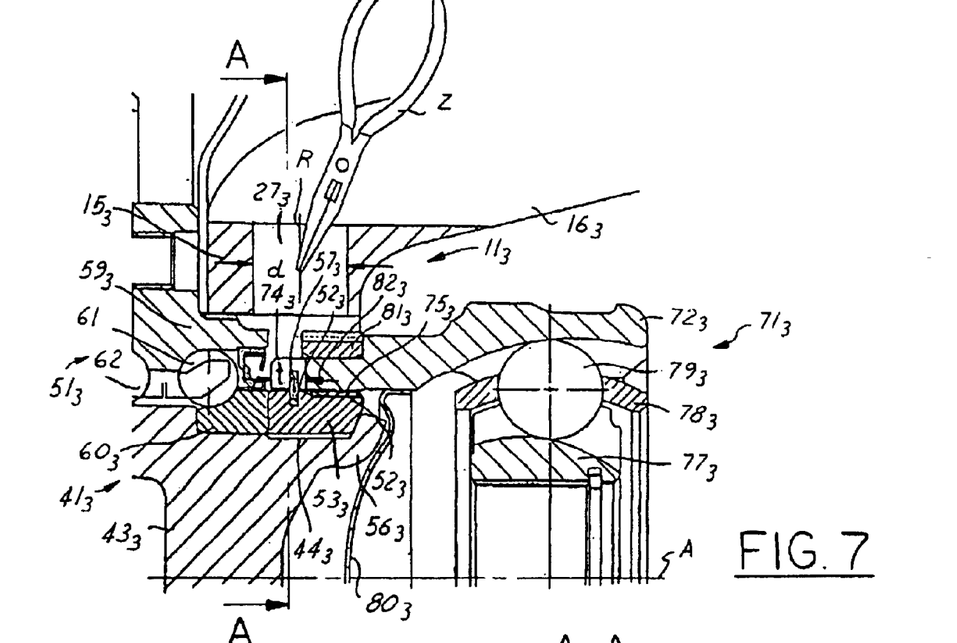
FIG. 7 shows a completely assembled unit of a third type with a radial bore in the annular part of the wheel carrier in half a longitudinal section.

FIG. 7, in half a longitudinal section, shows an assembled unit $10_3$ comprising a nub assembly $41_3$ and a constant velocity joint $71_3$. At the hub member $45_3$, there is provided an intermediate base $43_3$. A beading $56_3$ at the hub member $45_3$ holds a driving ring $55_3$ which engages the hub member $45_3$ via longitudinal toothings $44_3$. The driving ring $55_3$, in turn, holds an inner bearing race $60_3$ of a wheel bearing $51_3$. A seal $59_3$ seals the wheel bearing. Two rows $61_3$, $62_3$ of rolling contact members and the outer bearing race $59_3$ of the wheel bearing $51_3$ are also shown. At the driving ring $55_3$ it is possible to see an outer toothing $52_3$ and an annular groove $53_3$. The constant velocity joint $71_3$ comprises an outer joint part $72_3$ with a sleeve projection $82_3$, an inner joint part $77_3$, a cage $78_3$ and balls $79_3$. At the end face $73_3$ of the sleeve projection $82_3$, it is possible to see a notch $74_3$. An Inner toothing $75_3$ at the sleeve projection $82_3$ cooperates with an outer toothing $52_3$ at the driving ring $55_3$. At its circumference, the outer joint part $72_3$ carries a transmitter ring $81_3$ for an ABS sensor.

Of the wheel carrier $11_3$, there is shown only an annular part $15_3$ in section, with a steering arm $16_3$ being shown in a broken-off condition. In the annular part $15_3$, a radial bore $27_3$ whose central axis R extends approximately radially relative to the axis A of the assembly $10_3$ is axially associated with the annular groove $53_3$. Pliers Z indicate that free access to the securing ring $57_3$ is provided via said bore $27_3$ and via the notch $74_3$. The diameter d of the bore $27_3$ is greater than the axial depth t of the notch $74_3$. After the joint has been assembled, said ABS sensor can be inserted into the bore $27_3$.

Figure 8:
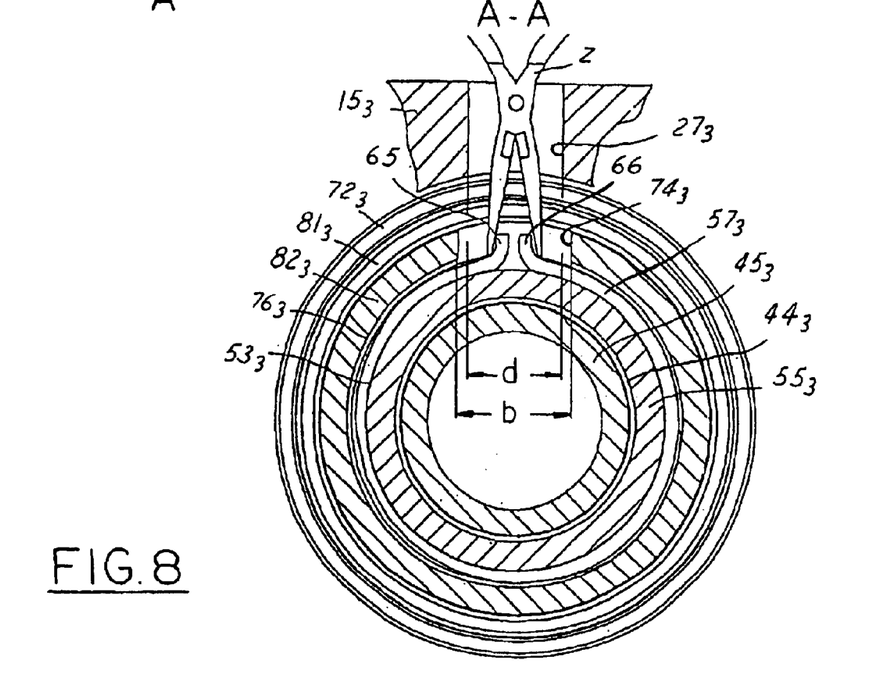
FIG. 8 shows the assembly according to FIG. 7 in a cross-sectional view along sectional line A—A.

FIG. 8, in a cross-sectional view along line A—A according to FIG. 7, shows the following details from the inside to the outside: a hub member $45_3$, toothing $44_3$, a securing ring $57_3$ in the annular groove $53_3$ and in the annular groove $76_3$, a sleeve projection $82_3$ at the outer joint part, with all said parts being shown in section; a notch $74_3$ in the sleeve projection $82_3$ and a transmitter ring $81_3$, each in a plan view; an outer joint part $72_3$ in a plan view; an annular part $15_3$ of the wheel carrier with a radial bore $27_3$ in a partially broken-away cross-section. At the securing ring, it is possible to see the ends $65_3$ and $66_3$ which are gripped and moved together by the pliers Z through the bore $27_3$, so that the securing ring $57_3$ leaves the inner groove $76_3$ in the sleeve projection $82_3$ at the outer joint part and the outer joint part can be removed from the wheel hub in a non-destructive way. The diameter d of the bore $27_3$ is smaller than the circumferential extension b of the notch $74_3$.

Figure 9:
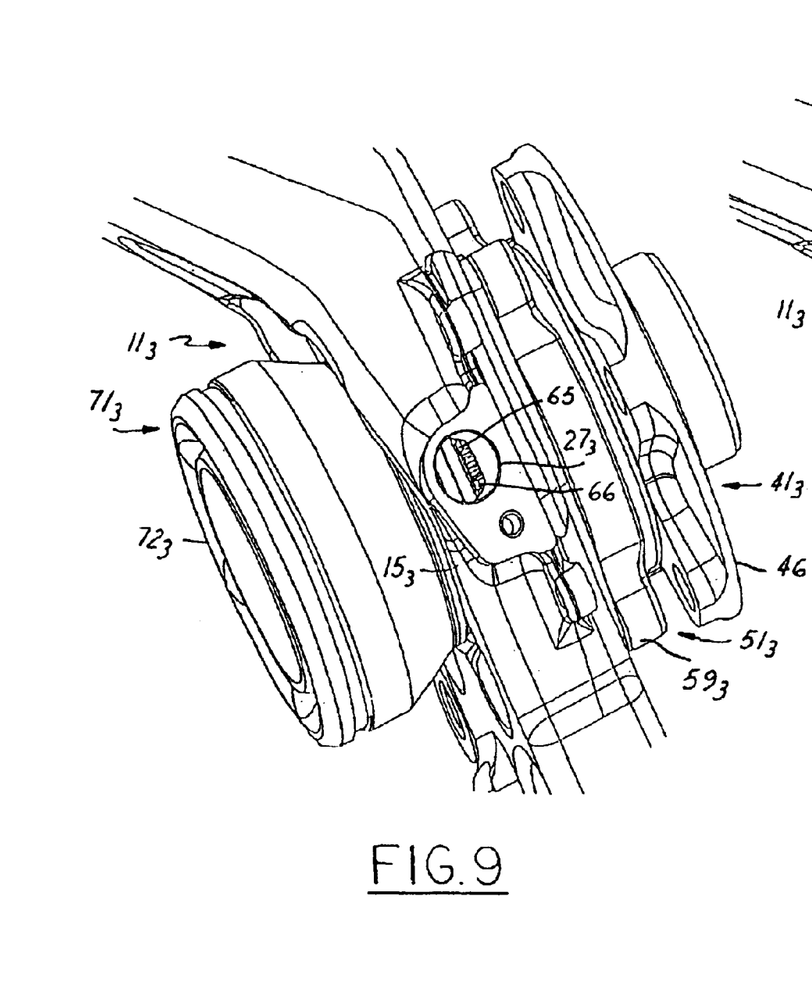
FIG. 9 shows the completely assembled unit in a linear illustration in a radial view of the bore in the annular part.

FIG. 9 shows the wheel carrier $11_3$, the wheel hub unit $41_3$ and the constant velocity joint $71_3$, with the details having been given the same reference numbers as in the previous Figures. The wheel hub unit is also shown to comprise a wheel flange $46_3$. In the annular part $15_3$, there is shown the radial bore $27_3$ which is provided with a continuous sealing ring $54_3$, and the free outwardly bent ends 65, 66 of the securing ring $57_3$ can also be seen. By gripping the ends 65, 66 of the securing ring $57_3$ and compressing same by means of the pliers Z, it is possible to reduce the securing ring $57_3$ in such a way that it enters the annular groove $53_3$ in the driving ring $55_3$ more deeply while at the same time sliding out of the inner annular groove $76_3$ in the outer joint part $72_3$, so that the constant velocity joint $71_3$ can be removed from the hub unit $41_3$ and especially from the driving ring $53_3$ in a non-destructive way.

Figure 10:
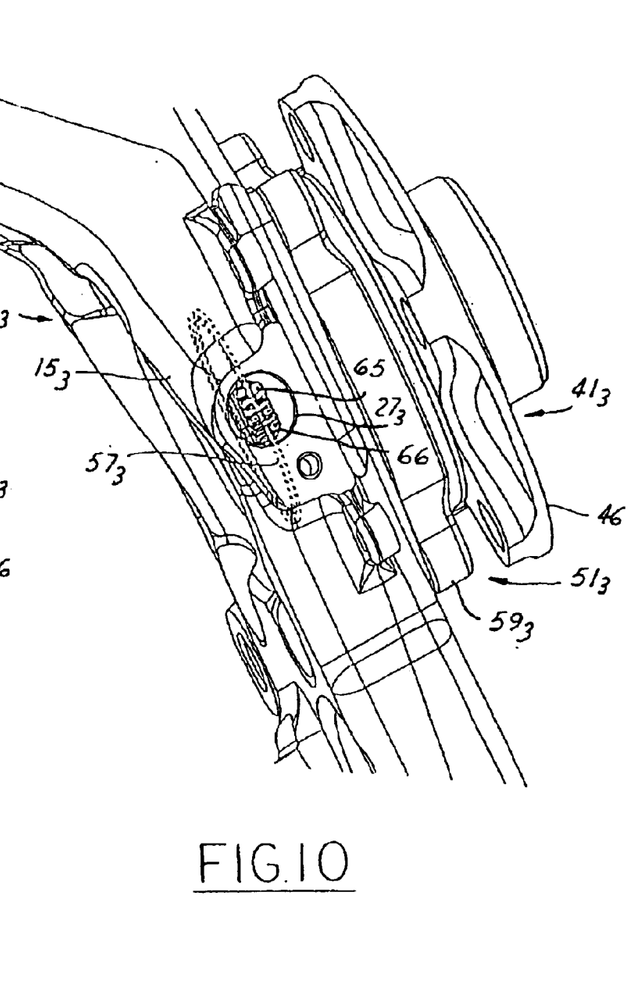
FIG. 10 shows the assembly according to FIG. 7 with a dis-mantled outer joint part in a shaded illustration in a radial view of the bore in the annular part.

FIG. 10 shows the assembly $10_3$ after the constant velocity universal joint $71_3$ has been removed. Through the radial bore $27_3$ it is possible to see the outer toothing $52_3$, the hub assembly $41_3$ with the turned annular groove $53_3$ and the securing ring $57_3$. The wheel hub $41_3$ is turned into the wheel bearing $51_3$ in such a way that, again, the ends $65_3$, $66_3$ of the securing ring $57_3$ become visible, which ends, in this way, can bearing manipulated through the radial bore.

| GKN Automotive GmbH | 11$^{th}$ December 2000 |
|---|---|
| Hauptstrasse 150 | Ne/bec (a1102128) |
| 53797 Lohmar | P9B052WO10 |

Assembly for Supporting and Drivingly Connecting a Wheel

| List of reference numbers | |
|---|---|
| 10 | assembly |
| 11 | wheel carrier |
| 13 | |
| 14 | |
| 15 | annular part |
| 16 | steering arm |
| 17 | eye |
| 18 | steering arm |
| 19 | eye |
| 20 | eye |
| 21 | eye |
| 22 | eye |
| 23 | eye |
| 24 | eye |
| 25 | eye |

-continued

List of reference numbers

| | |
|---|---|
| 26 | eye |
| 27 | broken-out portion, bore |
| 28 | flange face |
| 29 | eye |
| 30 | eye |
| 31 | threaded bore |
| 32 | threaded bore |
| 33 | threaded bore |
| 34 | threaded bore |
| 35 | through-hole |
| 36 | annular groove |
| 37 | |
| 38 | |
| 39 | |
| 41 | wheel hub |
| 42 | cap |
| 43 | intermediate base |
| 44 | toothing |
| 45 | hub member |
| 46 | wheel flange |
| 47 | flange eye |
| 48 | flange eye |
| 49 | flange eye |
| 50 | flange eye |
| 51 | rolling contact bearing |
| 52 | shaft toothing |
| 53 | annular groove |
| 54 | sealing ring |
| 55 | driving ring |
| 56 | beading |
| 57 | securing ring |
| 58 | sealing ring |
| 59 | outer bearing race |
| 60 | inner bearing race |
| 61 | row of rolling contact members |
| 62 | row of rolling contact members |
| 63 | eye |
| 64 | eye |
| 65 | ring end |
| 66 | ring end |
| 67 | |
| 68 | |
| 69 | |
| 70 | |
| 71 | constant velocity joint |
| 72 | outer joint part |
| 73 | end face |
| 74 | notch |
| 75 | inner toothing |
| 76 | annular groove |
| 77 | inner joint part |
| 78 | ball cage |
| 79 | ball |
| 80 | cover |
| 81 | transmitter ring |
| 82 | sleeve projection |

What is claim is:

1. An assembly for supporting a wheel of a motor vehicle and for drivingly connecting the wheel to a driveshaft, comprising:

a wheel carrier which is attachable to the motor vehicle and is provided with an annular part and a plurality of steering arms;

a wheel hub which is rotatably supported in the annular part of the wheel carrier and is provided with a flange for bolting on the wheel;

a rolling contact bearing with two rows of rolling contact members for supporting the wheel hub in the wheel carrier, which rolling contact bearing is insertable into the annular part of the wheel carrier; and a constant velocity joint which comprises an outer joint part removably connectable to the wheel hub, and an inner joint part connectable to the driveshaft, wherein the connection between the wheel hub and the outer joint part is provided by inter-engaging toothings of which a first toothing is formed at a part of the wheel hub and wherein a second toothing is formed at a sleeve projection at the outer joint part, and wherein the inter-engaging toothings are axially secured by a securing ring which engages two annular grooves of which a first annular groove is formed at said part of the wheel hub in the region of the first toothing and wherein a second annular groove is provided at the sleeve projection in the region of the second toothing, wherein, at the wheel carrier, in the annular part, in at least one circumferential position, there is provided a broken-out portion which axially cuts into the annular part from the wheel end and wherein, with the rolling contact bearing secured in the wheel carrier and with the outer joint part connected to the wheel hub, the two annular grooves are positioned so as to axially correspond to the broken-out portion, and the securing ring can be manipulated by pliers through the broken-out portion.

2. An assembly according to claim 1 wherein in the circumferential direction, directly on both sides of the broken-out portion, there are provided bolt openings between the annular part of the wheel carrier and the outer bearing race of the rolling contact bearing.

3. An assembly according to claim 2 wherein in a radial view, the broken-out portion is substantially U-shaped.

4. An assembly according to claim 1 wherein in a radial view, the broken-out portion is substantially U-shaped.

5. An assembly according to claim 1 wherein the toothings are inter-engaging hub toothings and shaft toothings and wherein, at the sleeve projection, in the region of the hub toothing, there is provided a circumferentially delimited and axially delimited notch which interrupts the second annular groove and which, with the outer joint part connected to the wheel hub, exposes the first annular groove in the shaft toothing of the wheel hub and the securing ring in a circumferentially delimited way.

6. An assembly according to claim 1 wherein the first toothing is provided at a separate driving ring which is slid on to the wheel hub and is non-removably secured thereto.

7. An assembly according to claim 6 wherein the driving ring axially rests against an inner bearing race of a first row of rolling contact members, which inner bearing race is slid on to the wheel hub and is clamped against an inner bearing race of a second row of rolling contact bearings.

8. An assembly for supporting a wheel of a motor vehicle and for drivingly connecting the wheel to a driveshaft, comprising:

a wheel carrier which is attachable to the motor vehicle and is provided with an annular part and a plurality of steering arms;

a wheel hub which is rotatably supported in the annular part of the wheel carrier and is provided with a flange for bolting on the wheel;

a rolling contact bearing with two rows of rolling contact members for supporting the wheel hub in the wheel carrier, which rolling contact bearing is insertable into the annular part of the wheel carrier; and a constant velocity joint which comprises an outer joint part removably connectable to the wheel hub, and an inner joint part connectable to the driveshaft, wherein the connection between the wheel hub and the outer joint part is provided by inter-engaging toothings of which a first toothing is formed at a part of the wheel hub and wherein a second toothing is formed at a sleeve projection at the outer joint part, and wherein the inter-engaging toothings are axially secured by a securing ring which engages two annular grooves of which a first annular groove is formed at said part of the wheel hub in the region of the first toothing and wherein a second annular groove is provided at the sleeve projection in the region of the second toothing, wherein, at the wheel carrier, in the annular part, in at least one circumferential position, there is provided a broken-out portion which axially cuts into the annular part from the joint end and wherein, with the rolling contact bearing secured in the wheel carrier and with the outer joint part connected to the wheel hub, the two annular grooves are positioned so as to axially correspond to the broken-out portion, and the securing ring can be handled by pliers through the broken-out portion.

9. An assembly according to claim 8 wherein in the circumferential direction, directly on both sides of the broken-out portion, there are provided bolt openings between the annular part of the wheel carrier and the outer bearing race of the rolling contact bearing.

10. An assembly according to claim 9 wherein in a radial view, the broken-out portion is substantially U-shaped.

11. An assembly according to claim 8, wherein the broken-out portion is positioned in the region of a steering arm into which it cuts radially.

12. An assembly according to claim 11 wherein, in an axial view, the broken-out portion is substantially U-shaped.

13. An assembly according to claim 8 wherein in a radial view, the broken-out portion is substantially U-shaped.

14. An assembly according to claim 8 wherein the toothings are inter-engaging hub toothings and shaft toothings and wherein, at the sleeve projection, in the region of the hub toothing, there is provided a circumferentially delimited and axially delimited notch which interrupts the second annular groove and which, with the outer joint part connected to the wheel hub, exposes the first annular groove in the shaft toothing of the wheel hub and the securing ring in a circumferentially delimited way.

15. An assembly according to claim 8 wherein the first toothing is provided at a separate driving ring which is slid on to the wheel hub and is non-removably secured thereto.

16. An assembly according to claim 15 wherein the driving ring axially rests against an inner bearing race of a first row of rolling contact members, which inner bearing race is slid on to the wheel hub and is clamped against an inner bearing race of a second row of rolling contact bearings.

17. An assembly for supporting a wheel of a motor vehicle and for drivingly connecting the wheel to a driveshaft, comprising:

a wheel carrier which is attachable to the motor vehicle and is provided with an annular part and a plurality of steering arms;

a wheel hub which is rotatably supported in the annular part of the wheel carrier and is provided with a flange for bolting on the wheel;

a rolling contact bearing with two rows of rolling contact members for supporting the wheel hub in the wheel carrier, which rolling contact bearing is insertable into the annular part of the wheel carrier; and a constant velocity joint which comprises an outer joint part removably connectable to the wheel hub, and an inner joint part connectable to the driveshaft, wherein the connection between the wheel hub and the outer joint part is provided by inter-engaging toothings of which a first toothing is formed at a part of the wheel hub and wherein a second toothing is formed at a sleeve projection at the outer joint part, and wherein the inter-engaging toothings are axially secured by a securing ring which engages two annular grooves of which a first annular groove is formed at said part of the wheel hub in the region of the first toothing and wherein a second annular groove is provided at the sleeve projection in the region of the second toothing, wherein, at the sleeve projection, in the region of the toothing, there is provided a circumferentially delimited and axially delimited notch which interrupts the second annular groove and which, with the outer joint part connected to the wheel hub, exposes the first annular groove and the securing ring in a circumferentially delimited way, and wherein an approximately radially extending bore is provided at the wheel carrier in the annular part and wherein, with the rolling contact bearing secured in the wheel carrier and with the outer joint part connected to the wheel hub, the two annular grooves are positioned so as to axially correspond to the bore and wherein the diameter (d) of the bore is smaller than or equal to the circumferential extension (b) of the notch and wherein the securing ring can be manipulated by pliers through the bore.

18. An assembly according to claim 17 wherein an axial depth (t) of the notch is smaller than the diameter (d) of the bore.

19. An assembly according to claim 19 wherein outwardly bent ends of the securing ring engage the notch and prevent rotation relative thereto.

20. An assembly according to claim 18 wherein outwardly bent ends of the securing ring engage the notch and prevent rotation relative thereto.

21. An assembly according to any claim 17 wherein the first toothing is provided at a separate driving ring which is slid on to the wheel hub and secured thereto so as to be non-removable.

22. An assembly according to any claim 18 wherein the first toothing is provided at a separate driving ring which is slid on to the wheel hub and secured thereto so as to be non-removable.

23. An assembly according to any claim 19 wherein the first toothing is provided at a separate driving ring which is slid on to the wheel hub and secured thereto so as to be non-removable.

24. An assembly according to any claim 20 wherein the first toothing is provided at a separate driving ring which is slid on to the wheel hub and secured thereto so as to be non-removable.

25. An assembly according to claim 17 wherein the driving ring axially rests against an inner bearing race of a first row of rolling contact members, which inner bearing race is slid on to the wheel hub and is clamped against an inner bearing race of a second row of rolling contact members.

26. An assembly according to claim 18 wherein the driving ring axially rests against an inner bearing race of a first row of rolling contact members, which inner bearing race is slid on to the wheel hub and is clamped against an inner bearing race of a second row of rolling contact members.

27. An assembly according to claim 19 wherein the driving ring axially rests against an inner bearing race of a first row of rolling contact members, which inner bearing race is slid on to the wheel hub and is clamped against an inner bearing race of a second row of rolling contact members.

28. An assembly according to claim 20 wherein the driving ring axially rests against an inner bearing race of a first row of rolling contact members, which inner bearing race is slid on to the wheel hub and is clamped against an inner bearing race of a second row of rolling contact members.

29. An assembly according to claim 21 wherein the driving ring axially rests against an inner bearing race of a first row of rolling contact members, which inner bearing race is slid on to the wheel hub and is clamped against an inner bearing race of a second row of rolling contact members.

30. An assembly according to claim 22 wherein the driving ring axially rests against an inner bearing race of a first row of rolling contact members, which inner bearing race is slid on to the wheel hub and is clamped against an inner bearing race of a second row of rolling contact members.

31. An assembly according to claim 23 wherein the driving ring axially rests against an inner bearing race of a first row of rolling contact members, which inner bearing race is slid on to the wheel hub and is clamped against an inner bearing race of a second row of rolling contact members.

32. An assembly according to claim 24 wherein the driving ring axially rests against an inner bearing race of a first row of rolling contact members, which inner bearing race is slid on to the wheel hub and is clamped against an inner bearing race of a second row of rolling contact members.

* * * * *